(12) United States Patent
Coers et al.

(10) Patent No.: US 8,166,738 B1
(45) Date of Patent: May 1, 2012

(54) COMBINE HEADER WITH CROP COMPRESSION ROLLERS

(75) Inventors: Bruce A. Coers, Hillsdale, IL (US); Glenn E. Pope, Viola, IL (US); Shane Marty Anderson, Syracuse, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/100,746

(22) Filed: May 4, 2011

(51) Int. Cl.
*A01D 43/00* (2006.01)

(52) U.S. Cl. .......................................... 56/181

(58) Field of Classification Search ............... 56/181, 56/14.4, 14.5, 208, 364, DIG. 15, 63
See application file for complete search history.

(56) References Cited

U.S. PATENT DOCUMENTS

| 885,157 | A | * | 4/1908 | Hovland | 56/14.5 |
|---|---|---|---|---|---|
| 2,515,808 | A | * | 7/1950 | Stoddard | 56/64 |
| 2,608,041 | A | * | 8/1952 | Schoenrock | 56/14.6 |
| 3,503,190 | A | * | 3/1970 | Van Der Lely | 56/13.6 |
| 3,584,443 | A | * | 6/1971 | Bulin | 56/13.8 |
| 3,681,901 | A | * | 8/1972 | Quick et al. | 56/13.6 |
| 4,070,810 | A | * | 1/1978 | Brakke | 56/291 |
| 4,487,004 | A | * | 12/1984 | Kejr | 56/14.4 |
| 4,512,140 | A | * | 4/1985 | Blakeslee | 56/11.6 |
| 4,565,056 | A | * | 1/1986 | Heidjann | 56/14.4 |
| 4,589,250 | A | * | 5/1986 | Faul, Jr. | 56/126 |
| 4,903,466 | A | * | 2/1990 | Sionneau | 56/14.6 |
| 5,005,343 | A | | 4/1991 | Patterson | |
| 5,255,500 | A | | 10/1993 | von Allwoerden | |
| 5,440,865 | A | * | 8/1995 | Hale | 56/14.4 |
| 5,464,371 | A | * | 11/1995 | Honey | 460/20 |
| 6,374,587 | B1 | * | 4/2002 | Wubbels et al. | 56/103 |
| 6,865,871 | B2 | * | 3/2005 | Patterson et al. | 56/181 |
| 7,958,711 | B1 | * | 6/2011 | Sauerwein | 56/181 |
| 7,971,420 | B1 | * | 7/2011 | Bollin | 56/208 |
| 2007/0000226 | A1 | * | 1/2007 | Grywacheski et al. | 56/364 |
| 2008/0098705 | A1 | | 5/2008 | Salley et al. | |

FOREIGN PATENT DOCUMENTS

DE 2646102 5/1977

* cited by examiner

*Primary Examiner* — Arpad Fabian-Kovacs

(57) ABSTRACT

A header (20) for an agricultural combine (10) comprises a laterally extending frame (28) supporting a laterally extending cutter bar (54) and left and right lateral belt conveyors (32, 34) supported on the frame (28). Each of the belt conveyors (32, 34) has a feeding direction from an outer side end towards a center of the header (20). Rotationally drivable left and right crop compression rollers (74) are supported on the frame (28) above the left and right lateral belt conveyors (32, 34). The crop compression rollers (74) extend substantially over the length of the left and right lateral belt conveyors (32, 34) and have a smooth cylindrical surface.

9 Claims, 8 Drawing Sheets

COMBINE HEADER WITH CROP COMPRESSION ROLLERS

FIELD OF THE INVENTION

This invention relates to headers for agricultural combines. More particularly, it relates to headers with belt conveyors for a lateral transport of the crop. Even more particularly, it relates to headers having crop compression rollers above the laterally feeding belt conveyors.

BACKGROUND OF THE INVENTION

Draper platforms are a type of header for an agricultural combine that use side to side belt conveyors rather than augers to carry crop material that is cut from the field by a cutter bar. These conveyors extend laterally from opposite lateral ends of the platform to a central region of the header. A central conveyor disposed between the two lateral conveyors receives crop from both the lateral conveyors and carries the crop rearward to the inlet of a feeder house which then carries the crop to the combine vehicle for threshing, separating and cleaning.

Normally, the lateral transport of the crop is only performed by the lateral belt conveyors. Some types of crop, like rape, tend to collect between the cutter bar and the back sheets of the header and build accumulations that the belt cannot remove. It was tried to remove such accumulations by laterally extending top augers mounted above the lateral belt conveyors. The top augers engage the crop material near the back sheets and keep the flow of material moving towards the central conveyor of the platform. However, if the auger speed is not closely matched to the speed of the lateral belt conveyors, the auger flights can disrupt the flow of crop material.

What is needed therefore is an improved top conveyor arrangement for mounting above the lateral belt conveyors of a draper platform that improves the lateral crop feeding process but is less dependent on the feeding speed of the lateral belt conveyors. It is an object of this invention to provide such a conveyor arrangement.

SUMMARY OF THE INVENTION

A header for an agricultural combine is arranged to be moved in a forward direction over a field. The header comprises a laterally extending frame supporting a laterally extending cutter bar. Laterally extending and generally vertical back sheets are disposed along the back of the header on left and right sides of the header. The back sheets have a central aperture therebetween. Left and right lateral belt conveyors are supported on the frame. Each of said belt conveyors has a feeding direction from an outer side end towards a center of the header. A central conveyor is disposed between the inner ends of the left and right lateral belt conveyors to receive cut crop material therefrom and convey it rearward through the aperture. Rotationally drivable left and right crop compression rollers are supported on the frame forward of the back sheets and above the left and right lateral belt conveyors. The crop compression rollers extend substantially over the length of the left and right lateral belt conveyors and have a laterally extending rotational axis and a smooth cylindrical surface with a circular cross section.

DESCRIPTION OF THE PREFERRED EMBODIMENT

Figure 1:
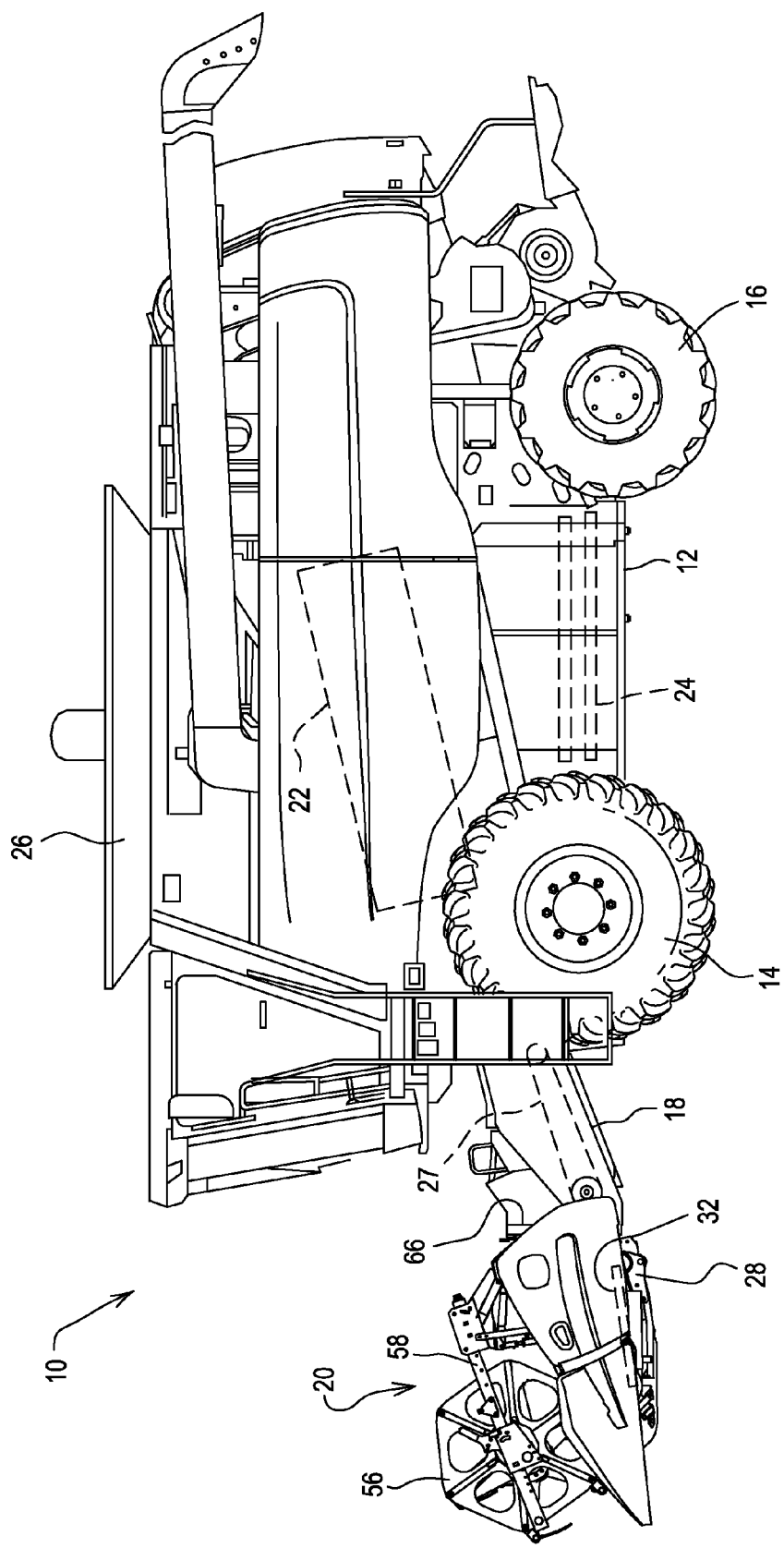
FIG. 1 is a side view of an agricultural combine supporting a header in accordance with the present invention.

Referring now to FIG. 1, a self-propelled agricultural combine 10 is shown comprising a supporting structure 12 supported on front wheels 14 and rear wheels 16, a feeder house 18 coupled to, extending forward from, and supported on the supporting structure, and a header 20 coupled to and supported on the front of the feeder house 18. During operation, the combine 10 drives in a forward direction over a field and receives cut crop material from the header 20 via the feeder house 18 and conveys it to an internal threshing and separating assembly 22. The threshed grain is cleaned in a cleaning section 24. Once cleaned, the combine 10 deposits the grain in a grain tank 26. In the following, all direction references like laterally, left and right, are given with respect to the forward direction, extending in FIG. 1 from the right to the left.

Feeder house 18 is pivotally coupled (around a horizontal and laterally extending axis) to the front of the combine 10. It has a conveyor 27 extending across the bottom of the feeder house 18 that conveys cut crop material rearward and into the threshing and separating assembly 22 of the combine 10.

Figure 2:
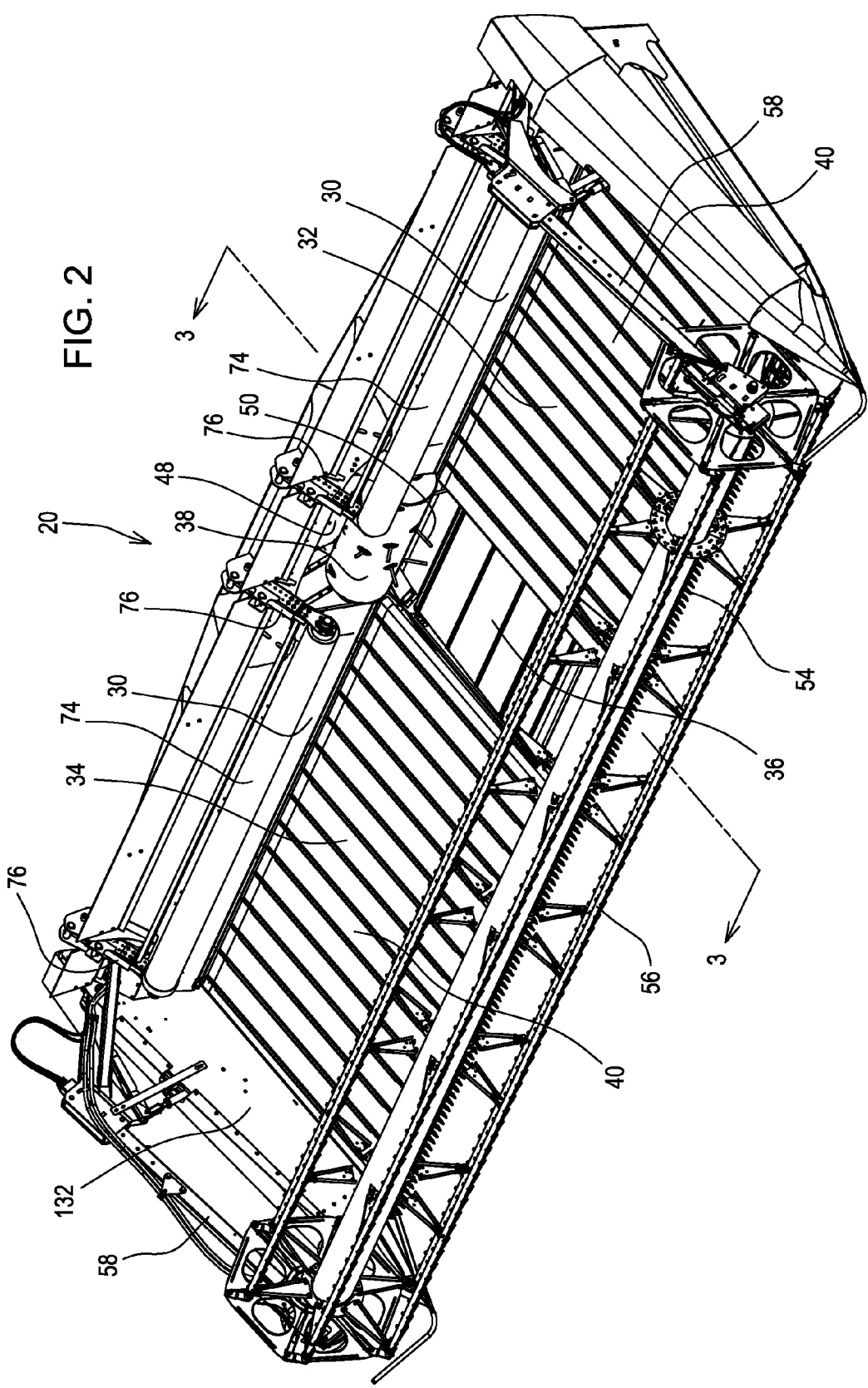
FIG. 2 is a perspective view of the header from the front left side.

Header 20 is coupled to and supported on the front of the feeder house 18. It has a frame 28 that extends generally horizontally across the width of the header 20, back sheets 30 (cf. FIG. 2) that extend generally vertically across the width of the header 20, and a conveying system comprising left and right lateral belt conveyors 32, 34 respectively, central conveyor 36, and feed drum 38.

The left and right lateral belt conveyors 32, 34 extend laterally across the width of the header 20 on the left and right sides of the header 20, respectively. Each of them comprises an endless belt 40 that is supported at its inner and outer ends on rollers, respectively (not shown, but reference is made to the disclosure of US 2008/0098705 A, the contents of which incorporated herein by reference). The inner rollers are mounted adjacent to a longitudinal center line of the header 20 providing a gap in between in which the central conveyor 36 is disposed. The endless belts 40 are coupled to motors (not shown) that drive the top surface of the belts 40 inwardly from the outer ends of the header 20 to a central region where the central conveyor 36 is located. It should be mentioned that two or more left and right lateral belt conveyors 32, 34 can be provided on both sides of the header 20, in particular for larger working widths. The outer lateral belt conveyor would then feed its crop to an inner lateral belt conveyor.

Figure 3:
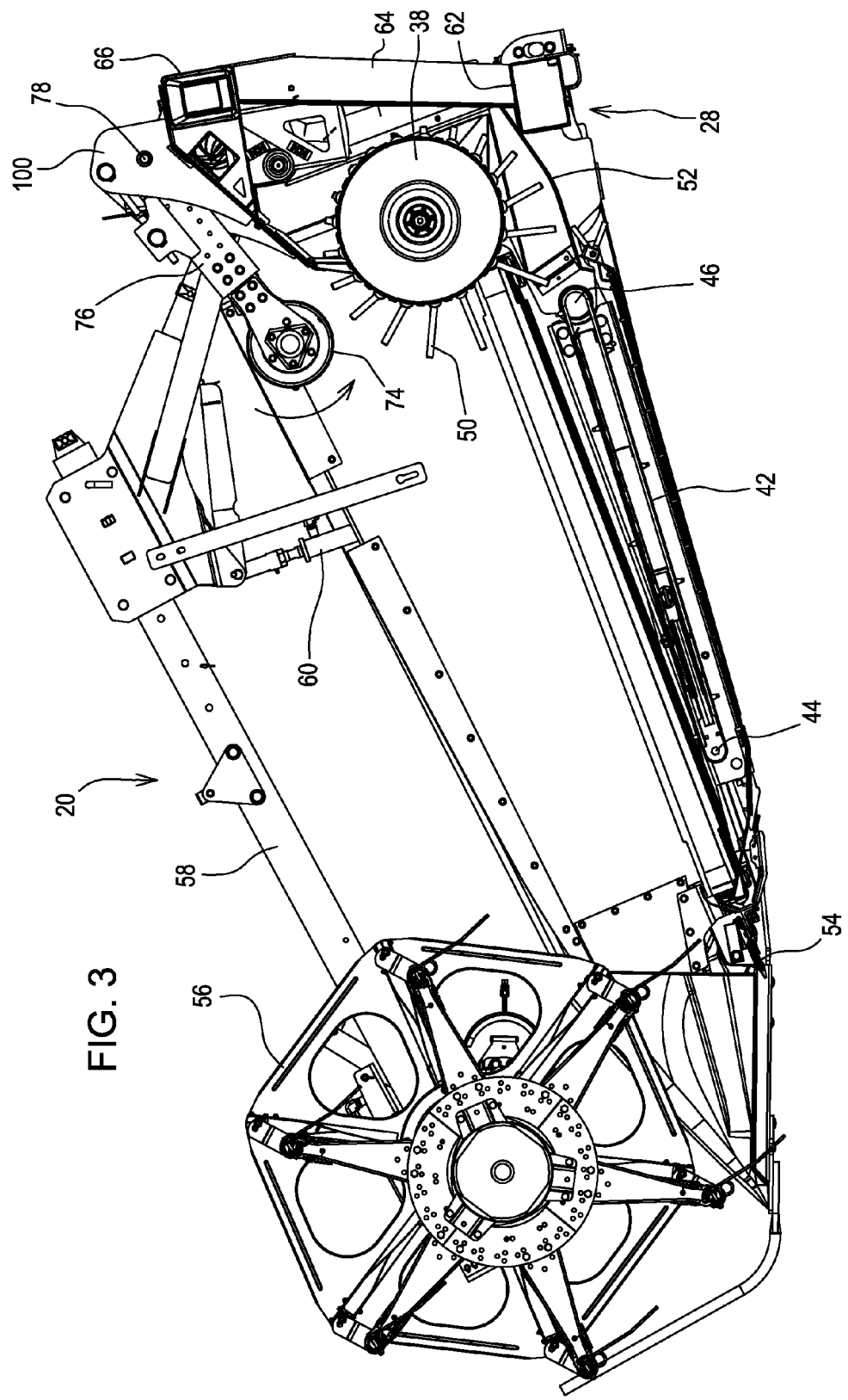
FIG. 3 is section through the header along the lines 3-3- of FIG. 2.
Figure 4:
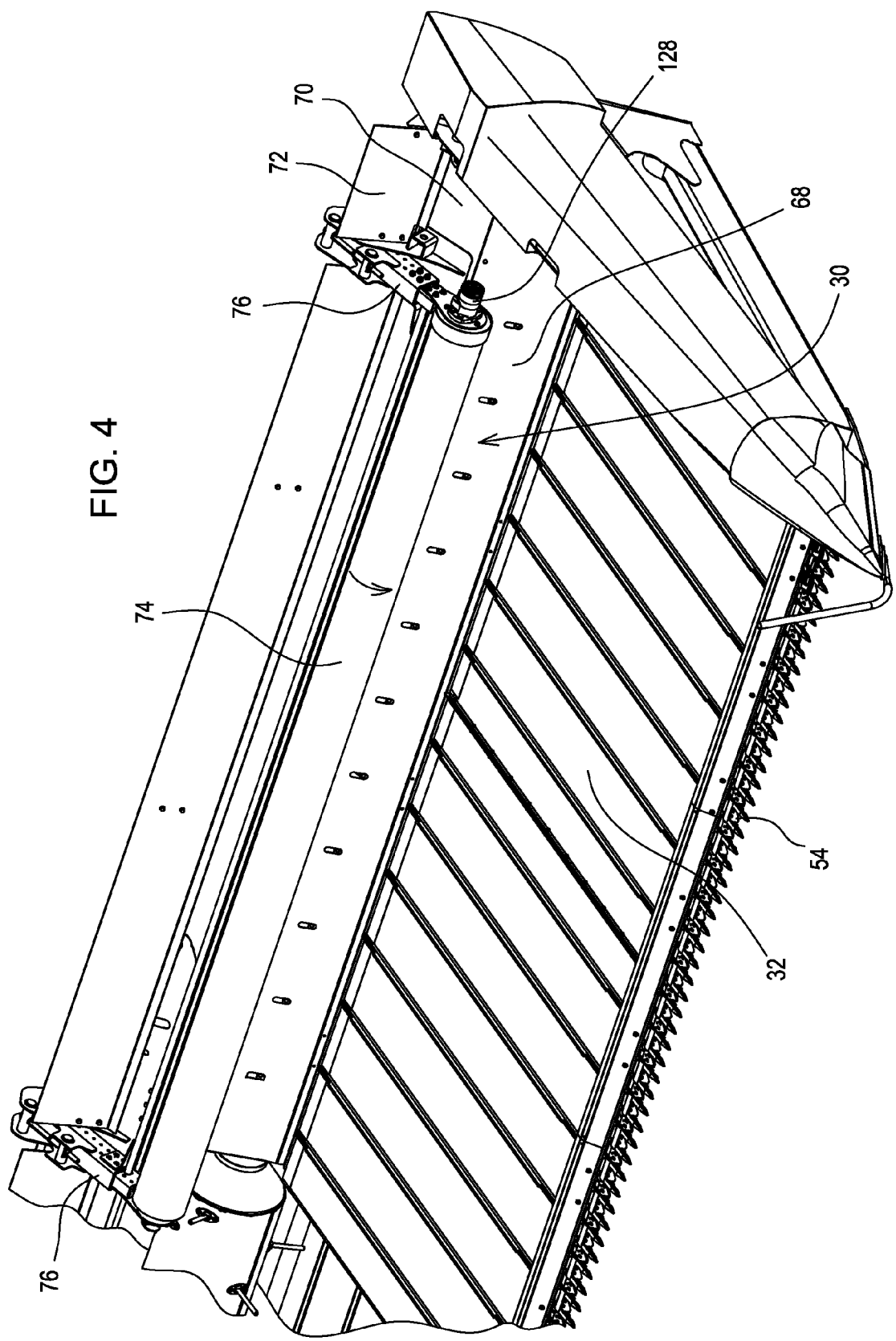
FIG. 4 is an enlarged perspective view of the left half of the header.
Figure 5:
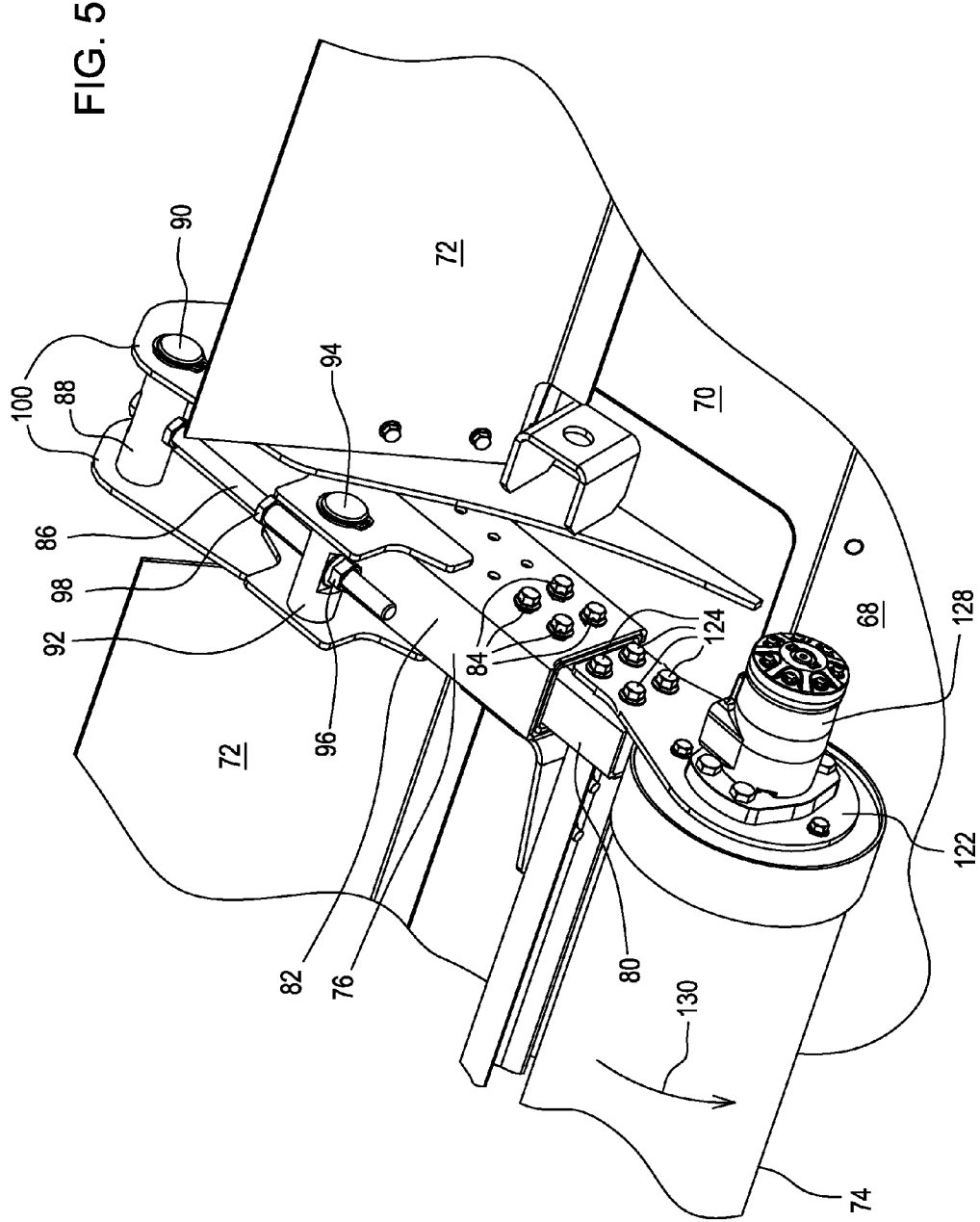
FIG. 5 is an enlarged perspective view of the left end of the crop compression roller of FIG. 4.

Referring now to FIG. 3, the central conveyor 36 comprises an endless belt 42 that is supported on a laterally extending front roller 44 and laterally extending rear roller 46. The front and rear rollers 44, 46 are disposed forward of the generally vertical back sheets 30 and slightly below the rollers of the left and right side belt conveyors 32, 34, such that cut crop material arriving at the central conveyor 36 must fall downward from the left and right lateral belt conveyors 32, 34 in order to rest on and engage the central conveyor 36.

Feed drum 38 extends laterally across the width of a central aperture 48 in the back sheets 30 of the header 20. It is partly disposed in the aperture 48 above the central conveyor 36 and just behind the rear roller 46. It has a plurality of fingers 50 extending therefrom that rotate together with the feed drum 38 to convey cut crop material from the central conveyor 36 rearward, underneath the feed drum 38 on a floor 52, and toward the feeder house 18.

At the front end of the header 20, a cutter bar 54 is provided for cutting the crop standing on a field. A reel 56 is supported on the frame 28 by means of arms 58 that can be moved up and down by hydraulic cylinders 60. The fore-and-aft position of the reel 58 can be altered by additional cylinders (not shown). The frame 28 comprises a laterally extending beam 62 on which the left and right lateral belt conveyors 32, 34, the central conveyor 36 and the cutter bar 54 are rigidly or floatingly supported. Vertical bearers 64 mount an upper cross beam 66 to beam 62. Upper cross beam 66 is hooked to the upper front end of the feeder house 18. The back sheets 30 are also mounted to the frame 28 and have a lower portion 68 extending vertically from the rear edges or the left and right lateral belt conveyors 32, 34, a center portion 70 above the lower portion 68 extending upwards and rearwards from the upper edge of the lower portion 68, and an upper portion 72 extending vertically from the upper edge of the center portion 70.

Crop compression rollers 74 are mounted above the rear portion of the left and right lateral belt conveyors 32, 34. The crop compression rollers 74 extend horizontally in a lateral direction substantially over the lateral extension of the left and right lateral belt conveyors 32, 34. The inner end of the crop compression rollers 74 is in close vicinity of the inner end of the respective left and right lateral belt conveyor 32, 34. The outer end of the crop compression rollers 74 is in close vicinity of the outer end of the respective left and right lateral belt conveyor 32, 34 and of side walls 132 of the header 20. The crop compression rollers 74 have a circle shaped cross section and are cylindrical without any ridges or edges. Thus, their surface is entirely smooth. They rotate during operation around their central axis that extends horizontally and laterally.

Figure 6:
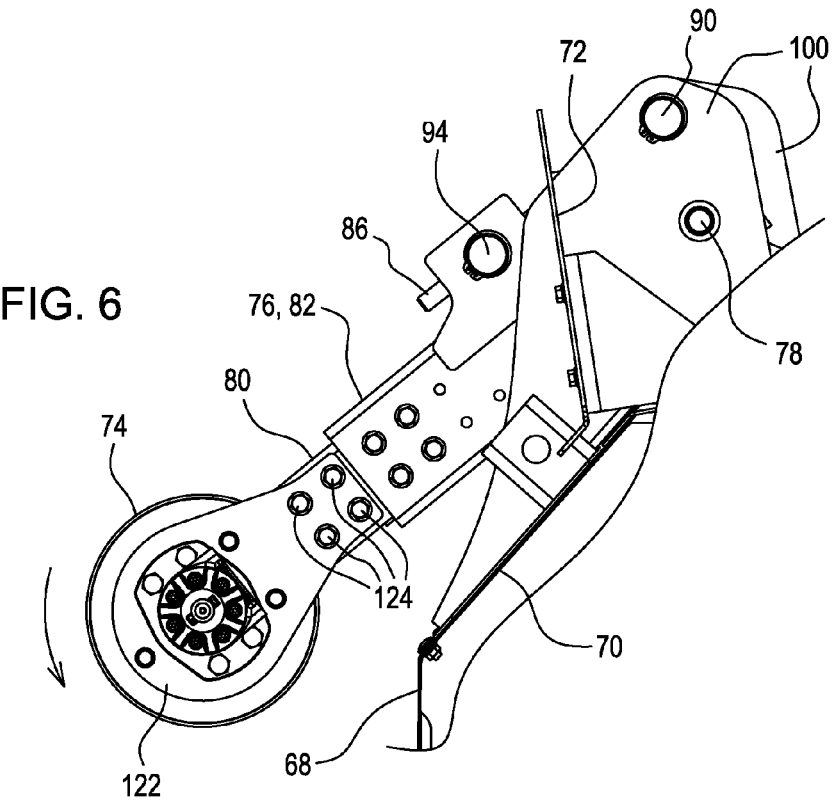
FIGS. 6 and 7 are end views of the crop compression roller in its lowest and highest positions, respectively.
Figure 7:
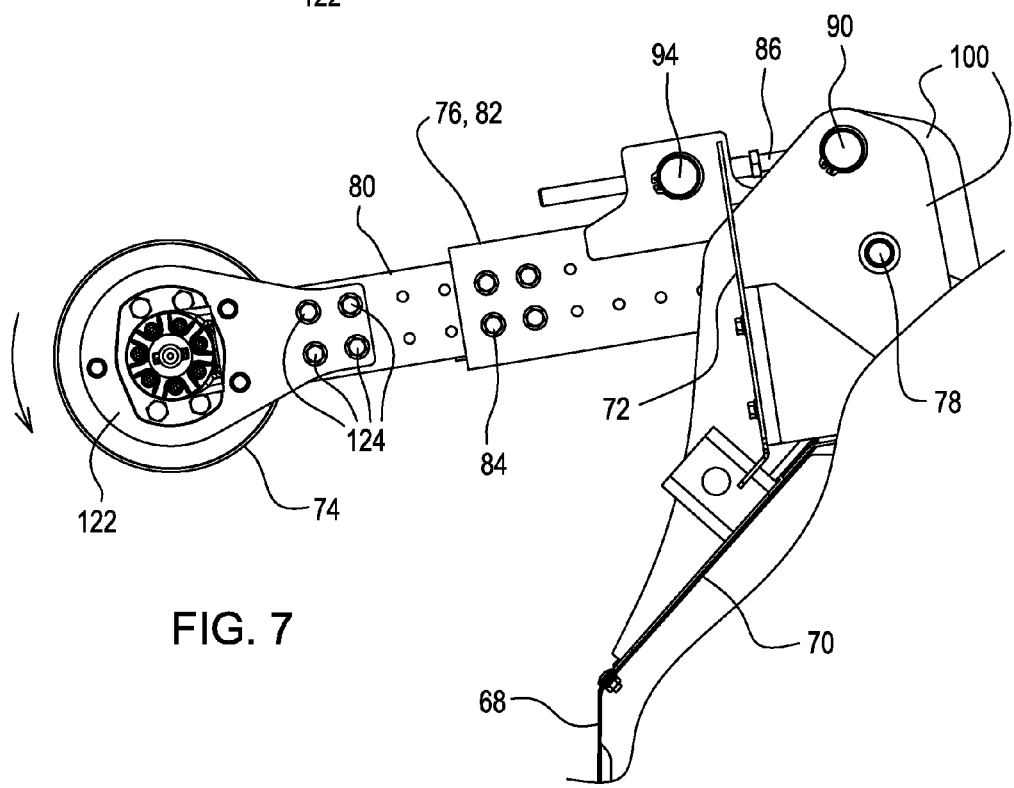

The crop compression rollers 74 are supported on their both ends on the frame 28 by arms 76. The arms 76 pivot at their rear end on horizontal, laterally extending axes 78. The arms 76 each comprise a first part 80 in the form of a hollow tube with rectangular cross section supporting the crop compression rollers 74 and a second part 82 in the form of a hollow tube with rectangular cross section supported on the frame 28. The second part 82 is pivotably supported between two brackets 100 which are preferably welded to the upper cross beam 66. The first part 80 is connected to the second part 82 by removable bolts 84. Once the bolts 84 are removed, the first part 80 can be telescoped with respect to the second part 82 and fixed in a different position in order to alter the fore-aft-position of the crop compression rollers 74, as indicated in FIGS. 6 and 7.

The highest and lowest possible positions of the arms 76 and thus the crop compression rollers 74 are defined by a stop mechanism comprising a bar 86 that is on its rear end fixed to a first laterally extending member 88 that can pivot with respect to frame 28 around a laterally extending axis 90. Bar 86 also extends through a second laterally extending member 92 that can pivot with respect to the second part 82 of the arm 76 around a laterally extending axis 94. Inner and outer stop elements 96, 98 on both sides of the second member 92 limit the possible movement of the arm 76 around the axis 78, as indicated in FIGS. 6 and 7.

Figure 8:
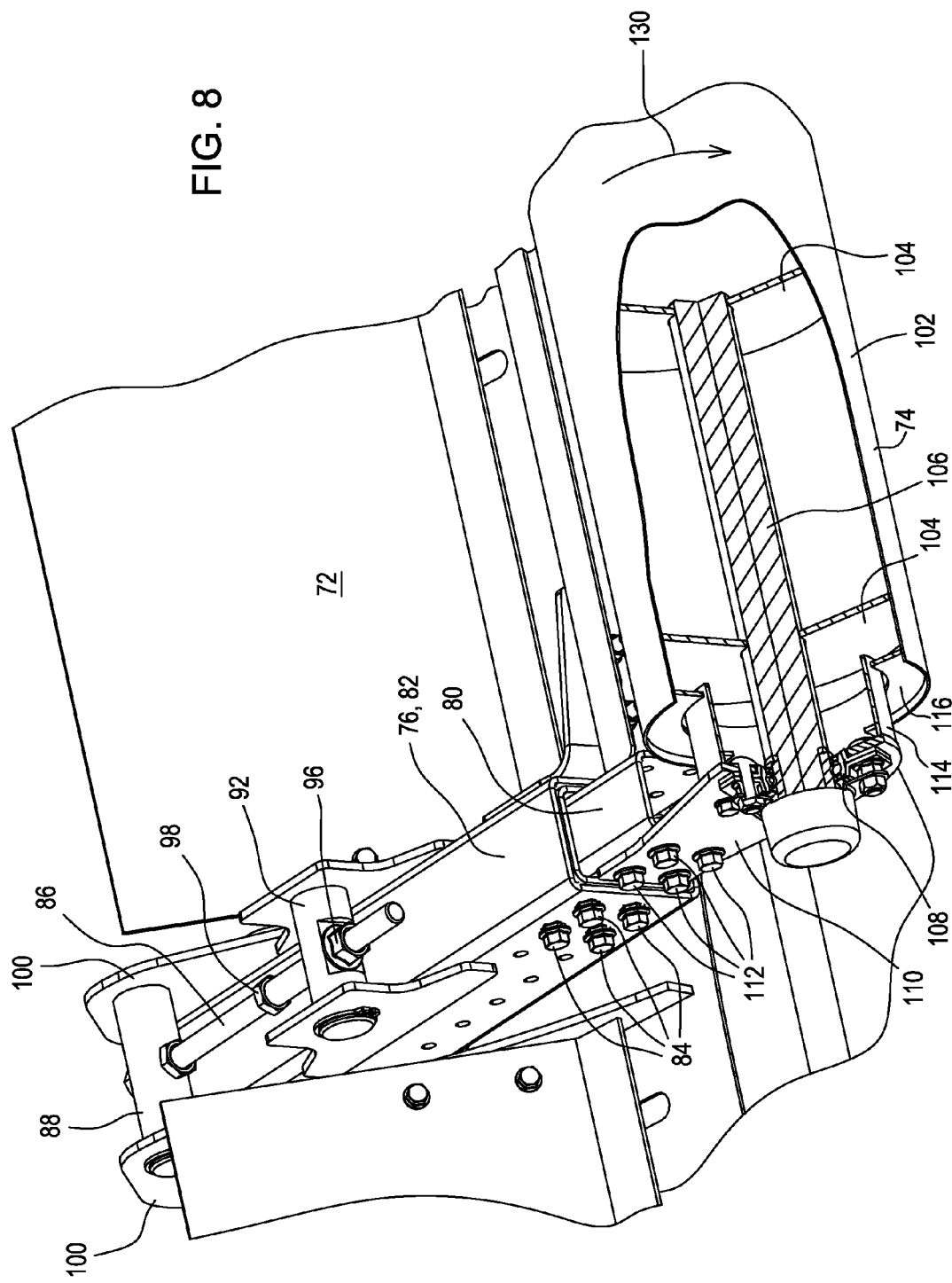
FIG. 8 is a perspective, partially cut view of the right end of the crop compression roller of FIG. 4.
Figure 9:
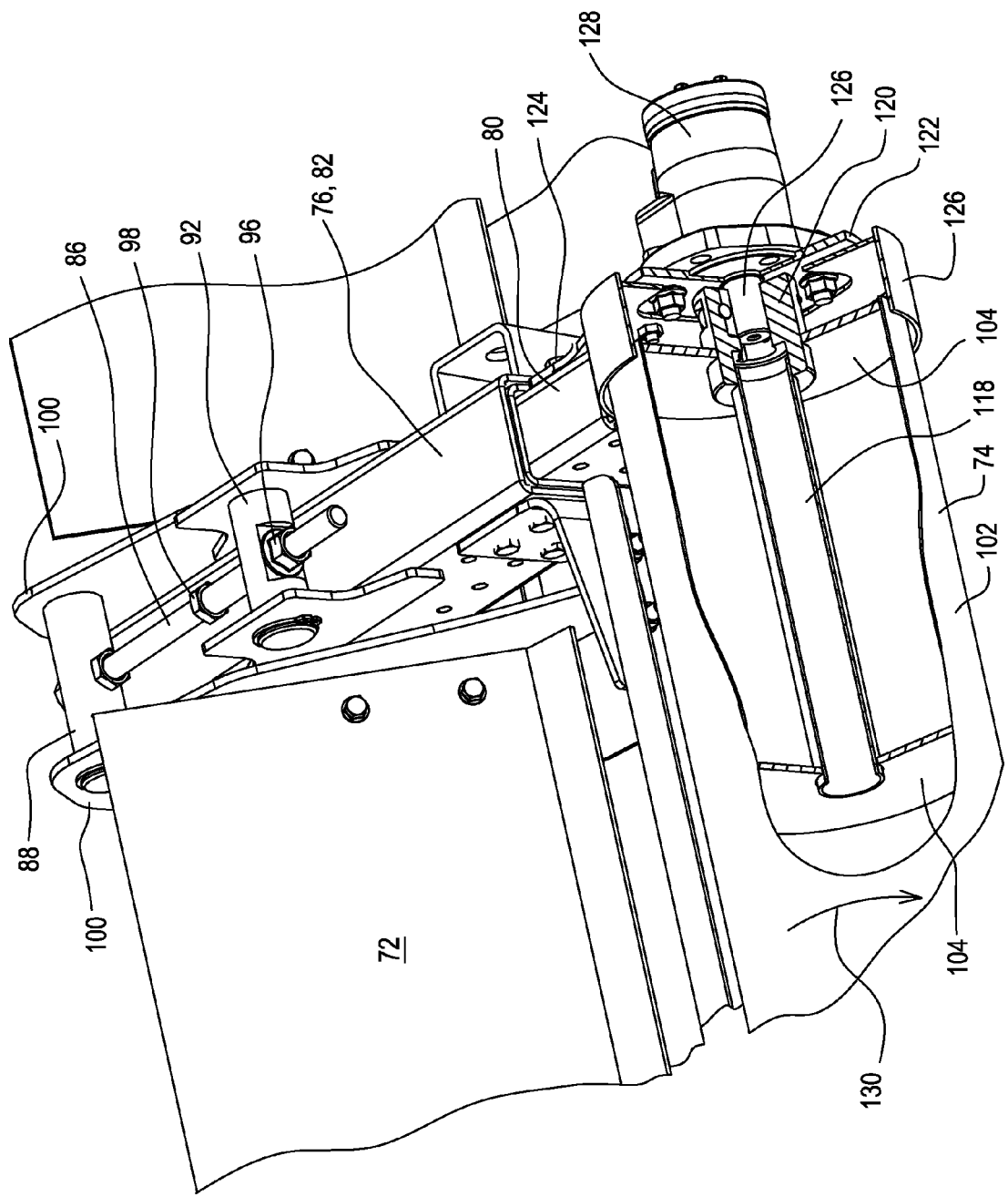
FIG. 9 is a perspective, partially cut view of the left end of the crop compression roller of FIG. 4.

As shown in FIGS. 8 and 9, the crop compression rollers 74 each comprise a shell 102 that receives two support disks 104 in the vicinity of both ends, respectively. The two disks 104 adjacent the inner end of the crop compression rollers 74 are connected to a central axle 106 that is rotatably supported in a bearing 108 outside the crop compression roller 74. The bearing 108 is mounted in a bracket 110 connected to the first part 80 of the arm 76 by means of bolts 112. A short tube 114 mounted to the bracket 110 extends through a central opening in an end ring 116 of the crop compression roller 74.

The two disks 104 adjacent the outer end of the crop compression rollers 74 are connected to a central shaft 118 that is rotatably supported in a bearing 120. The bearing 120 is mounted in a bracket 122 connected to the first part 80 of the arm 76 by means of bolts 124. A short tube 126 mounted to the bracket 122 surrounds the outer end portion of the crop compression roller 74. The shaft 118 is connected to an output shaft 126 of a hydraulic motor 128. During operation, the hydraulic motor 128 drives the respective crop compression roller 74 such that its front face moves downwards, as indicated by arrow 130. The hydraulic motor 128 is powered from the hydraulic system of the header 20 or of the combine 10 and its speed can be fixed or variable, in particular to be controlled from the operator station of the combine 10.

During the harvesting operation, the cutter bar 54 cuts the crop that stands or lies on the field in front of the header 20. The cut crop is then fed by the respective left and right lateral belt conveyor 32, 34 and then by the central conveyor 36 and the feed roller 38 through the outlet 48. Some types of crop, like rape, tend to build bridges between the cutter bar 54 and the rear walls 30. The crop compression rollers 74 compress the crop mat above the respective left and right lateral belt conveyors 32, 34 such that their cleats can remove the crop. The crop compression rollers 74 thus help to avoid crop accumulations above the left and right lateral belt conveyors 32, 34. Due to their smooth shape, the rotation speed of the crop compression rollers 74 does not need to be adjusted to the speed of the left and right lateral belt conveyors 32, 34. The tubes 114, 126 help avoiding that crop enters into the crop compression rollers 74 and crop accumulations in this area.

Having described the preferred embodiment, it will become apparent that various modifications can be made without departing from the scope of the invention as defined in the accompanying claims.

For example, positioning of the left and right crop compression rollers 74 is shown as performed manually by removing the bolts 84 and telescoping the first part 80 with respect to the second part 82. Instead, the fore-aft-position of the compression rollers 74 could be adjusted by hydraulic cylinders or electric actuators (not shown) that can preferably be remotely controlled by an operator from the cab of the combine 10. Such cylinders or actuators can be mounted inside or outside the first part 80 and second part 82 in order to provide the telescoping motion.

Further, the compression rollers 74 are shown as arranged exactly transversely to the forward direction of the header 20 and horizontally. In another embodiment, their outer ends could be in a fixed or manually or remotely controlled adjustable manner. located further to the front or to the rear than their inner ends which are located close to the central conveyor 36 in order to provide a converging or diverging effect. Analogously, the outer ends of compression rollers 74 could be in a fixed or manually or remotely controlled adjustable manner located higher or lower in a vertical direction than their inner ends. Thus, in a possible embodiment, the vertical and/or fore-aft-position of one or both ends of each crop compression roller 74 is separately adjusted manually or by a respective hydraulic cylinder or electric actuator that can be remotely controlled by an operator from the cab of the combine 10.

The invention claimed is:

1. A header (20) for an agricultural combine (10) arranged to be moved in a forward direction over a field, the header (20) comprising:
- a laterally extending frame (28) supporting a laterally extending cutter bar (54);
- laterally extending and generally vertical back sheets (30) disposed along the back of the header (20) on left and right sides of the header (20), the back sheets (30) having a central aperture (48) therebetween;
- left and right lateral belt conveyors (32, 34) supported on the frame (28), each of said belt conveyors (32, 34) having a feeding direction from an outer side end towards a center of the header (20);
- a central conveyor (36) disposed between the inner ends of the left and right lateral belt conveyors (32, 34) to receive cut crop material therefrom and convey it rearward through the aperture (48); and
- rotationally drivable left and right crop compression rollers (74) supported on the frame (28) forward of the back sheets (30) and above the left and right lateral belt conveyors (32, 34), the crop compression rollers (74) extending substantially over the length of the left and right lateral belt conveyors (32, 34) and having a laterally extending rotational axis and a smooth cylindrical surface with a circular cross section.

2. The header (20) of claim 1, wherein the crop compression rollers (70) can be driven such that their forward faces move downwards.

3. The header (20) of claim 1, wherein the crop compression rollers (70) are supported at their ends on vertically moveable arms (76).

4. The header (20) of claim 3, wherein the arms (76) are extendable.

5. The header (20) of claim 4, wherein the arms (76) are telescopic.

6. The header (20) of claim 1, wherein each of the crop compression rollers (74) is driven by a hydraulic motor (128) mounted at the outer end of the crop compression roller (74).

7. The header (20) of claim 1, wherein the speed of the crop compression roller (74) is one of fixed and variable.

8. The header (20) of claim 1, wherein the crop compression roller (74) is supported on a bracket (110, 122) holding a tube (114, 126) that extends into one of the interior of an end ring (116) of the crop compression roller (74) and over a shell (102) of the crop compression roller (74).

9. A combine (10) having a supporting structure (12) supported on wheels (14, 16), a feeder house (18) and header (20) according to claim 1 mounted to the feeder house (18).

* * * * *